Jan. 19, 1965    H. L. SHATTO, JR    3,165,899
UNDERWATER MANIPULATOR WITH SUCTION SUPPORT DEVICE
Filed Sept. 11, 1963    2 Sheets-Sheet 2

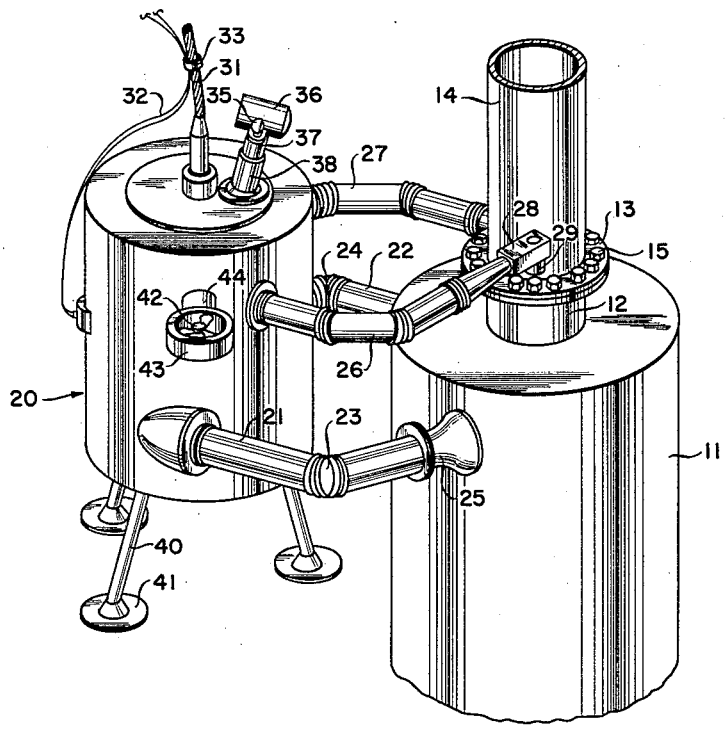

INVENTOR:
H. L. SHATTO, JR.
BY: J. H. McCartney
HIS AGENT

United States Patent Office 3,165,899
Patented Jan. 19, 1965

3,165,899
UNDERWATER MANIPULATOR WITH
SUCTION SUPPORT DEVICE
Howard L. Shatto, Jr., Palos Verdes, Calif., assignor to
Shell Oil Company, New York, N.Y., a corporation of
Delaware
Filed Sept. 11, 1963, Ser. No. 308,270
4 Claims. (Cl. 61—69)

This invention relates to apparatus for carrying out operations at underwater installations and pertains more particularly to a method and apparatus for manipulating equipment in the vicinity of, or which are components on, an underwater installation, such for example as an underwater wellhead, an underwater oil and gas production facility, storage facilities, etc.

A recent development at offshore locations is the installation of large amounts of underwater equipment used in producing oil fields and gas fields situated many miles from shore. Many of the wells are being drilled in water up to 600 feet deep, a depth greater than divers can safely work. Thus, in drilling wells, producing wells, installing underwater equipment on the ocean floor, and carrying out workover operations underwater at any of the various ocean floor installations, use has been made of what is known as an underwater manipulator. One such manipulator is described in U.S. Patent 3,099,316, which manipulator makes use of a track secured to the underwater installation on which the manipulator is designed to be seated and moved thereon. However, many underwater structures may not be provided with a manipulator track at the time they are installed or positioned at an underwater installation so that in the event that it is necessary to make repairs at a later date, a manipulator of the above-mentioned type cannot be readily employed.

Consideration has been given to the use of magnets or electromagnets carried by a manipulator device by which the manipulator device could be secured to an underwater installation during the time it is carrying out a particular operation thereon. However, in order to combat sea water corrosion, there has been a tendency to make more of the underwater equipment of stainless steel on which electro-magnets cannot be used to mount a manipulator device.

It is therefore a primary object of the present invention to provide a manipulator device provided with suitable connector means for securing it to any underwater installation whether made of magnetic or nonmagnetic materials.

A further object of the present invention is to provide a manipulator apparatus for use on component parts of underwater installations, which parts are so large or smooth that it is impossible to engage it by a mechanical gripping device such as a claw arm, hook, etc.

Another object of the present invention is to provide an underwater manipulator device having means for supporting it on the smooth outer wall of a large diameter storage tank or other vessel position on the ocean floor or at enormous depths below the surface of the ocean.

A still further object of the present invention is to provide a remotely controlled manipulator device adapted to move through a body of water and be temporarily secured to a smooth surface of an underwater installation for carrying out the various operations of setting, adjusting, connecting or disconnecting component parts of the underwater installation.

These and other objects of this invention will be understood from the following description taken with reference to the drawing, wherein:

FIGURE 1 is an isometric view illustrating a manipulator of the present invention supporting itself on the smooth outer walls of an underwater tank while connecting the bolts at the top thereof;

FIGURE 2 is a view taken in partial cross section of one form of a suction-type connector arm carried by the manipulator device of FIGURE 1;

Figure 3:
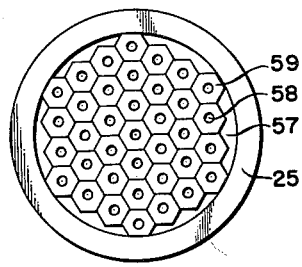
FIGURE 3 is a view taken along the line 3—3 of FIGURE 2.

Referring to FIGURE 1 of the drawing, an underwater wellhead installation is shown in the form of a large diameter cylindrical structure, for example a tank, footing of a bridge or offshore platform, etc., and having a flanged opening 12 at the upper end thereof to which the lower flanged end 13 of a tubular member 14, such as a pipe or leg, is fixedly secured by means of bolts 15. For descriptive purposes, it is assumed that the flange joint secured by bolts 15 is in a substantial distance above the ocean floor so that a manipulator device positioned on the ocean floor could not reach the bolts 15.

Positioned adjacent the underwater cylindrical structure 11 and clinging to the outer surface thereof is an underwater manipulator device generally represented by numeral 20. The manipulator device 20 is provided with at least one support or connector device or arm for securing the manipulator device to the underwater installation 11. As shown in FIGURE 1 of the drawing, the connector apparatus may take the form of a pair of articulated arms 21 and 22 having one or more flexible joints 23 and 24. It is to be understood that while articulated arms are preferred, the connector means may merely comprise one or more single rigid arms or support members.

Each of the arms is provided at its outer end with suitable suction means in the form of a suction cup device 25, one form of which will be described in more detail with regard to FIGURE 2 hereinbelow. The articulated arms may be selectively actuated to move in any desired and possible position and may be electrically, mechanically, pneumatically or hydraulically operated from a remote location and/or from the manipulator device 20 itself in a manner well known to the art.

In addition to the connector arms 21 and 22, the underwater manipulator device 20 is provided with one or more outwardly-extendible and movable work-engaging arms 26 and 27, which may be articulated as illustrated. A suitable instrument, tool or work-engaging device, such as a mechanically-operated power wrench 28 having a socket head 29 thereon, is mounted for operation at the end of at least one of the arms. It is to be understood that a different tool could be mounted at the ends of two arms simultaneously.

A cable 31 is secured to the top of the manipulator device 20 for lowering the manipulator device through the water and/or supplying power thereto. In the event that the prime mover means (not shown) within the manipulator device are electrically operated, the cable 31 may be a combined weight-bearing and power-transmission cable formed as a single unit. Alternatively, electric power or hydraulic fluid could be transmitted through a separate conduit or conduits 32 into the manipulator device 20 for energizing the various elements of the manipulator device. The conduits 32 are preferably secured to the cables 31 by means of clamps 33. The prime mover apparatus, which may be of any suitable type employed to move, extend and retract or position the various arms 21, 22, 26 and 27 with respect to the body member of the manipulator device, or with respect to each other, is contained within the manipulator device 20, while the circuitry employed to energize and actuate selectively the various elements may be contained in the manipulator device 20, or in a controller at an operation base above the surface of the water, or split between the two locations.

To aid in operations being carried out by the manipulator device 20, the manipulator device 20 is provided with one or more swivel-mounted flood lights 35 and one or more television cameras 36, for lighting the area in the vacinity of the underwater installation and observing operations, respectively.

The flood lights 35 and television camera 36 may be mounted on a pan-and-tilt mechanism 37 of any commercial type which in turn may be mounted on an extensible or telescoping arm 38 which may be swivel-mounted on its base. Both the lights 35 and the television camera 36 are remotely controlled by an operator positioned, say, at the surface of the water on an operating vessel, the signal from the cameras being transmitted through the cable 31. In the event that it is desired to use the manipulator device 20 of the present invention while it is positioned on the ocean floor, the manipulator device 20 is provided with a plurality of support legs 40, each leg preferably having a swivel-mounted support plate 41 at the lower end thereof.

In using the manipulator device 20 of the present invention on an underwater installation as described hereinabove, the manipulator device 20 is lowered through the water on the cable 31 from a hoist (not shown) on a work vessel or from a platform (not shown) positioned on or above the surface of the water. Alternatively, if the manipulator device 20 is made large in size the interior of the manipulator device may act as an air chamber tending to float the device, and the buoyancy of the chamber could be altered as desired by admitting water into it through a remotely-controlled valved opening to sink the device down to the underwater installation. Alternatively, the manipulator device 20 could be lowered by providing it with an independent large float chamber secured to the top of the manipulator device so that a signal could be transmitted through the cable 31 to an electrically-controlled flood valve in the chamber for partially flooding the chamber and altering its buoyancy so as to allow the manipulator device 20 to sink into place on or adjacent the underwater installation 11. The manipulator device 20 may be guided into place by the support cable 31.

Alternatively, the manipulator device 20 may be provided with one or more propellers 42 mounted in an open-sided housing 43 which in turn is rotatably mounted on a shaft or arm 44 and remotely positionable by signal transmitted from the surface through cable 31. The propellers 42 may be driven by uni-directional or reversible motors (not shown). While the manipulator device is shown as being provided with motor driven propellers 42, it is to be understood that any suitable type of propulsion means may be employed for moving the manipulator device 20 through the water. Thus, instead of using the motor-driven propellers 42, pumps may be substituted to jet fluid through suitable jet nozzles to move the manipulator device through the water in a manner well known to the art.

Preferably, the manipulator device has a substantially neutral buoyancy so that it can be readily moved through the water by means of the propellers 42. The propellers 42 would be turned together with the housing 43 to the position illustrated in FIGURE 1 when it was desired to adjust the vertical position of the manipulator device with regard to the underwater installation 11. When it was desired to move the manipulator device 20 toward or away from the underwater installation 11, the propellers 42 in their housing 43 would be turned at a substantially 90° angle to that illustrated in FIGURE 1.

With the manipulator device positioned adjacent the underwater installation 11, the manipulator device 20 would be moved toward the cylindrical structure 11 so that the suction cup device 25 of the manipulator device 20 was positioned substantially flush against the outer surface of the cylindrical structure 11. In the event that the manipulator device 20 was provided with at least two connector or support arms 21 and 22, the arms 21 and 22 would be moved to an angle so that their individual suction cup device 25 would fit flush against the outer surface of the cylindrical structure 11 at fairly widely spaced positions for greater stability. Suction would then be applied to the suction devices 25 so as to secure the manipulator device to the cylindrical structure 11. The work-engaging arms 26 and 27 then are moved forwardly, with observation from the television camera 36, to engage and do work on the selected components of the underwater structure 11.

One form of a source of suction for the suction cup device 25 (FIGURE 1) is shown in FIGURE 2 as comprising a pump 46, preferably a positive-displacement pump driven by motor 47, both the pump 46 and the motor 47 being preferably mounted within the section of arm 21a adjacent the suction cup 25. The motor 47 is provided with power through power leads 48 extending from the manipulator 20. The discharge 49 of the pump 46 discharges into the interior of the arm section 21a and then the fluid is discharged through discharge ports 50 through the wall of the arm 21a. Extending from the intake 51 of the pump 46 is a conduit 52 in communication with the interior 53 of a suction head 25. If desired, a strainer 54 may be interposed in the conduit between the suction head 25 and the pump 46.

One form of suction cup is shown in FIGURE 2 as comprising a resilient cup-like member 25 molded around a cylindrical housing or support member 55, preferably having perforations 56 therein to aid in bonding the resilient material to the metal of the support structure 55. Instead of using a single suction cup 25, the interior of the suction cup may be filled with a resilient material 57 having a plurality of flow passages 58 therethrough, each flow passage 58 being in communication with a small-diameter suction cup 59 formed on the face of the resilient material 57. Thus, a plurality of small-diameter suction cups 59 may be arranged as shown in FIGURE 3. The flow rate of fluids through the suction cups 25 and through the many small passages 58 thereof would be restricted so that if one cup or segment was positioned on a barnacle or a rough portion of the surface of the underwater installation 11 (FIGURE 1), the pump 46 (FIGURE 2) could continuously pull water through one or more of the flow passages 58 and still maintain an overall suction on the suction head sufficient to support the manipulator device 20 on the underwater installation 11. If the surface of the underwater installation 11 was considerably fouled with marine growth, one of the work-engaging arms 26 or 27 could be provided with a scraping or rotary cleaning tool for cleaning the surface of the installation 11 prior to seating the suction cups 25 thereagainst.

The use of a flow restricting orifice in the flow path from each suction cup, or individual cell within a larger cup, should prevent destruction of the suction differential if some of the cups should be out of contact with the surface to which attachment is being made.

Relatively small-diameter cups 25 are able to support tremendous loads at deep water installations due to the hydrostatic force acting against the back side of the suction cup 25 and forcing it against the surface in which it is in contact. Assuming no leakage in the pump system, the pump 46 is preferably arranged to shut down automatically when a predetermined differential pressure has been reached. This is accomplished by use of a conventional differential-pressure switch in the system. Normally, the suction cups are released from the underwater object by reversing the flow through the pump 46 or by any other suitable means well known to the art. Thus, a remotely controllable valved bypass line from the outside of the suction cup in communication with the interior 53 thereof may be provided for allowing fluid to enter the suction cup and release it. Alternatively, the pump 46 may be arranged to stall against zero flow of fluid to the pump and have a slip clutch 60 such as a hydraulic coupling or an eddy-current coupling, both of which may be water-cooled.

Figure 4:
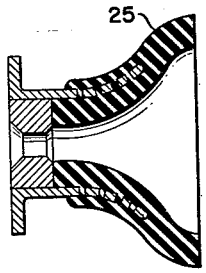
FIGURES 4, 5 and 6 are views taken in cross section of different arrangements of suction cup support means carried by the connector arms of the manipulator device of FIGURE 1.
Figure 5:
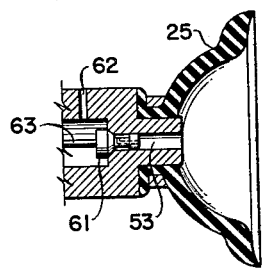

In FIGURE 4, the suction cup 25 is shown as being a single cup with a single passage therethrough. The suction cup device 25 of FIGURE 5 is shown as being provided with a valve 61 for closing the passage 53 against water pressure from outside the arm through port 62 when it was desired to disconnect the suction cup 25 from its underwater installation. The tubular valve stem 63 would be retracted by any suitable means, as by means of a solenoid, to open the valve 61 and let water pressure from the outside into the interior of the suction cup 25.

Thus, FIGURE 5 shows a cup which is arranged for use without a pump. This cup would be bumped against the flat surface to express the water and produce a suction differential by elastic deformation of the cup 25. The pull rod 63 can be used to unseat valve 61 to equalize pressures between conduits 53 and 62 to release the suction cup.

Insead of employing a pair of articulated arms 21 and 22 having suction cups 25 at the ends thereof as shown in FIGURE 1, the manipualtor device 20 may be provided with one or more rigid arms or support means 64 and 65 for securing a connector plate 66 to the outside of the manipulator device 20. A connector plate may be of any suitable shape and is preferably shaped to mate with the surface of the object against which it is to be positioned. Thus, the connector plate shown in FIGURE 7 is concave and curved at the same radius as the radius of the outer wall of the cylindrical structure 11 (FIGURE 1).

Figure 7:
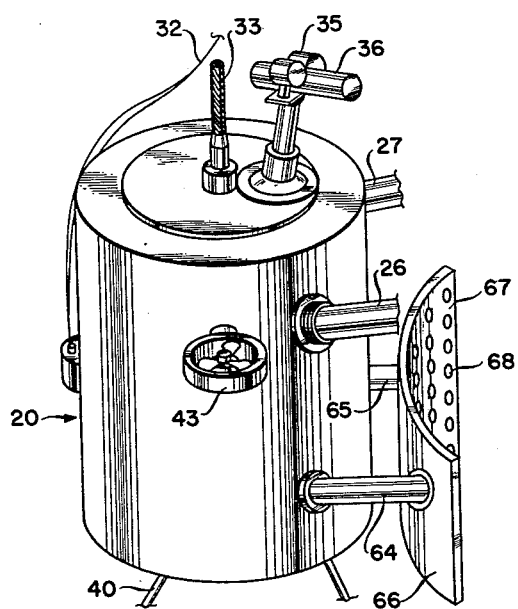
FIGURE 7 is a isometric view illustrating another form of the manipulator apparatus having a plate-type connector means with a suction face curved in a manner to secure to the outer curved surface of a tank.
Figure 8:
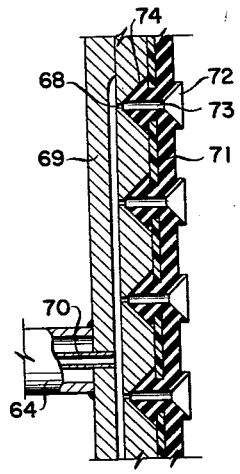
FIGURE 8 is a fragmental view, taken in cross section, illustrating the suction cups carried by the connector plate of FIGURE 7.

The face 67 of the connector plate 66 (FIGURE 7) is provided with a plurality of openings or fluid passageways 68 which are in communication with a common passageway 69 and thence will port 70 which in turn would be connected to the suction end of a pump 46 as described hereinabove with regard to FIGURE 2, or with any suitable source of suction carried either in the arm 64 or the manipulator device 20 (FIGURE 7). Molded to fit on and be secured to the face 67 of the perforate connector plate 66 is a resilient pad or blanket 71 having a plurality of small-diameter suction cups 72 formed on the outer face thereof, therebeing fluid passageways through the suction cups 72 and blanket 71 in communication with the passageway 69 in the connector plate 66. If desried, rubber or plastic sections 74 may be molded to extend from the back of the pad or blanket 71 and fit in a fluid-tight manner within the opening 68 in the face of the connector plate 66.

Figure 6:
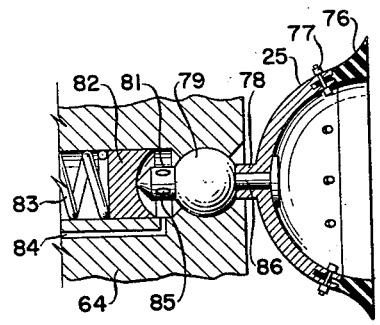

As an alternative to using articulated arms 21 and 22 of FIGURE 1, one or more rigid arms 64 and 65 may be employed as shown in FIGURE 7 with a suction cup secured in a flexible manner to the end of each arm 64 or 65. As shown in FIGURE 6 the suction cup 25 may be of steel with merely the lip 76 of the cup being of flexible material secured to the steel section by means of bolts 77 or other suitable means. The tubular stem 78 of the suction cup 25 is flexibly mounted at the end of the arm 64 as by means of a ball-and-socket joint 79. The flexible mounted suction cup 25 may have a self-centering or aligning device provided which may comprise a pointed plug fixedly secured to the back of the ball joint 79 with the point of the plug 81 in contact with a conically concave contact surface of an axially slidable member 82 normally being forced against the pointed plug 81 by means of a compression spring 83. Suction would be applied to the suction cup 25 through the passageway 84 in arm 64, through ports 85 in plug 81 and thence through conduit 86 in stem 78. It is to be understood that the apparatus of the present invention can be used to do work on the bottom of a boat while clinging thereto.

I claim as my invention:

1. Apparatus for carrying out operations at underwater installation comprising
    a housing lowerable through a body of water,
    television camera means carried by said housing and adapted to be directed to a work area adjacent said underwater installation,
    propulsion means carried by said housing for moving said housing at least laterally through a body of water,
    connector means carried outwardly on said housing for securing it to said underwater installation, said connector means including a rigid plate,
    mounting means securing said plate to the outside of said housing, said plate having perforations therethrough,
    said rigid plate and perforation forming suction means directed outwardly from said housing and adapted to engage a surface of said underwater installation,
    said suction means including a resilient suction cup surrounding each of said perforations and having a flow passage through said cup in communication with said perforation,
    a source of suction carried by said housing, and
    conduit means in communication between said source of suction and said perforation, said suction means of a size to maintain said housing in secured arrangement on said underwater installation.

2. The apparatus of claim 1 wherein said rigid plate of said suction means is of a form to substantially mate with a mating portion of said underwater installation.

3. Apparatus for carrying out operations in an underwater installation, said apparatus comprising
    a housing lowerable through a body of water,
    connector means including at least two rigid arms secured to said housing and directed outwardly therefrom on substantially the same side of the housing,
    suction means carried at the ends of said arms, said suction means including at least one suction cup at the outwardly extending end of each arm,
    said suction cups being filled with an impermeable material having the surface of said material at the open end of the cup formed into a plurality of small-diameter suction cups,
    individual flow passageways through said material in communication with each of the small-diameter suction cups, and
    conduit means in communication between a source of suction carried by said housing and each of the individual flow passageways through the material in the suction cups, said suction means being of a size sufficient to maintain said housing in secured arrangement on said underwater installation.

4. The apparatus of claim 3 including flow-restricting means in each of said flow passageways.

References Cited by the Examiner
UNITED STATES PATENTS

| | | | |
|---|---|---|---|
| 633,882 | 9/99 | Moissenet | 248—363 |
| 1,304,012 | 5/19 | Begeron | 61—69 |
| 1,979,782 | 11/34 | Wiley et al. | 61—69 |
| 2,040,958 | 5/36 | Romano | 61—69 |
| 2,799,205 | 7/57 | Bascik | 248—363 |
| 2,987,893 | 6/61 | Robinson | 61—69 |
| 3,099,316 | 7/63 | Johnson | 166—66.5 |

CHARLES E. O'CONNELL, *Primary Examiner.*